Jan. 9, 1968 R. MANGINELLI 3,362,463
METHOD OF MAKING A POROUS INVESTMENT MOLD
Filed Oct. 2, 1964 2 Sheets-Sheet 1

INVENTOR
Ralph Manginelli
BY
Attorney

Jan. 9, 1968  R. MANGINELLI  3,362,463
METHOD OF MAKING A POROUS INVESTMENT MOLD
Filed Oct. 2, 1964  2 Sheets-Sheet 2
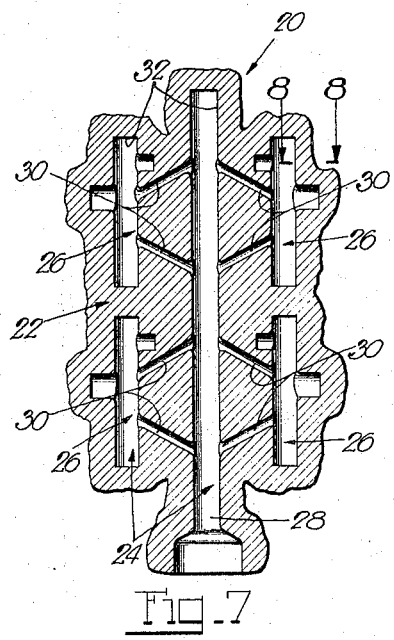
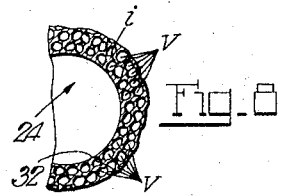
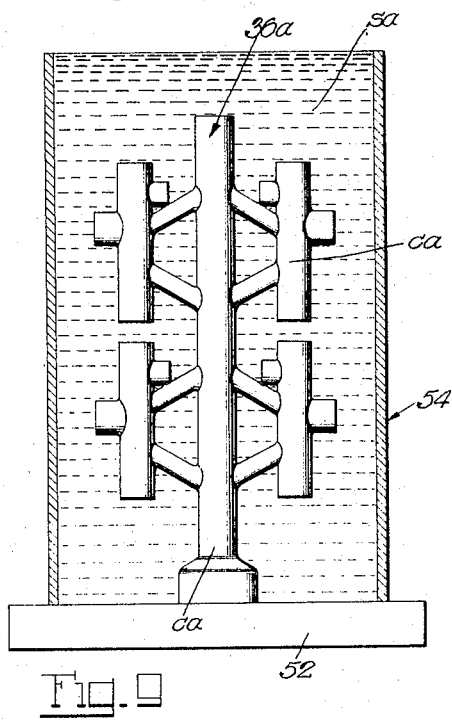
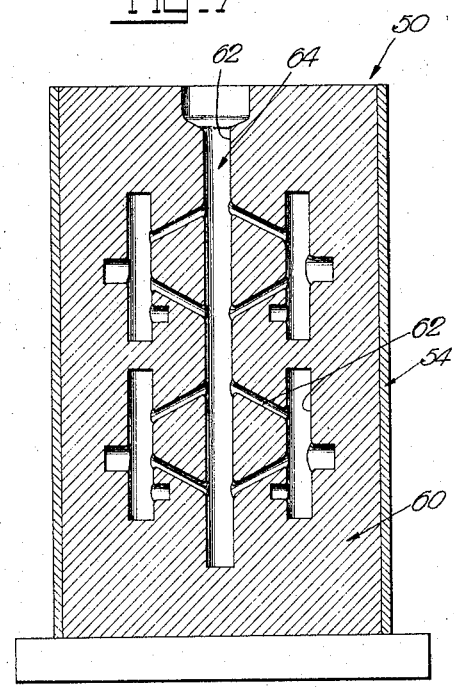
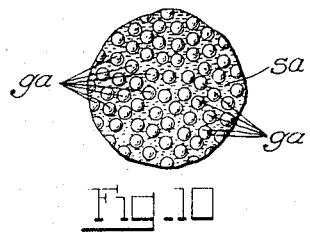
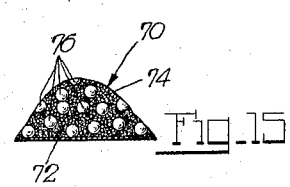
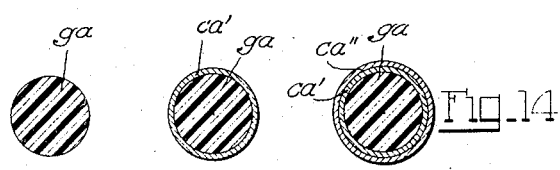
INVENTOR
Ralph Manginelli
BY
Attorney United States Patent Office 3,362,463
Patented Jan. 9, 1968

3,362,463
METHOD OF MAKING A POROUS
INVESTMENT MOLD
Ralph Manginelli, 6 Clover St.,
West Haven, Conn. 06516
Filed Oct. 2, 1964, Ser. No. 401,096
3 Claims. (Cl. 164—34)

This invention relates to investment casting in general, and to molds for investment casting in particular.

Molds for investment casting, which are either of shell-type or of flask-type, have a refractory body with an internal mold cavity that defines the part or parts to be cast, and a suitable gating system for conducting a charge of molten metal to the mold cavity, with the mold cavity and gating system being formed in the mold body by removal therefrom of a correspondingly shaped pattern of heat-disposable material, usually by melt-out of a wax pattern. The mold body, which is customarily made from fine granular refractories and suitable binders, called "investment material," is formed differently for shell and flask molds. Thus, for making a shell mold, the mold body is built up by repeatedly dipping the disposable pattern into a refractory slurry and alternately sifting dry refractory grain onto the wet pattern, with the pattern being customarily air-dried after each grain application. For making a flask mold, the mold body is formed by pouring into an upright flask about the disposable pattern therein a refractory slurry which is customarily permitted to harden in air. If the flask mold is used for ferrous casting, the pattern is customarily precoated by dipping into a slurry of very fine granular material and allowed to dry before pouring the back-up slurry therearound in the flask. With the mold body of either type of mold thus formed, the mold is customarily placed in an oven which is kept at a temperature to melt out the bulk of the disposable pattern, whereupon the mold is placed into another, burn-out oven of considerably higher temperature in which the mold is "fired" for the removal therefrom of all residue of the disposable pattern, with the mold being charged with molten metal as soon as possible after removal from the burn-out oven. If the mold is used for non-ferrous casting, the same need not be placed in a melt-out oven but may be placed directly into a burn-out oven in which the disposable pattern is melted out in its entirety.

While molds thus formed are entirely satisfactory in most respects, they leave much to be desired in a few but important respects. Thus, with the refractory mold bodies of shell molds having considerable bulk for adequate strength and those of flask molds being even far more massive, the cost of these molds and, hence, of the castings therefrom is rather high owing to the high cost of the investment material that goes into the formation of the mold bodies. Also, with the investment material being rather fine-grained and having a relatively high specific gravity, the mold bodies are rather heavy which makes unavoidable carrying and other handling of the molds a burdensome task.

It is the primary aim and object of the present invention to provide for investment casting of parts with considerably greater ease, and even more important, at quite substantially lower cost, than was possible heretofore.

It is thus among the objects of the present invention to provide molds of investment type of which the mold bodies are in their composition different from, and of much lower cost and weight than, the composition of the mold bodies of previous molds of this type.

It is another object of the present invention to provide molds of this type of which the mold bodies are composed of investment material as usual, but are throughout, except at the cavity surfaces, of sponge-like, rather than solid, formation and consistency, with the solid body material having dispersed throughout a great number of voids which in total take up a large part of the volume of the mold bodies, yet leave the solid body material joined throughout sufficiently for rigidity and adequate strength of the mold bodies. In thus providing the mold bodies in sponge-like formation, the total investment material going into these bodies is in amount equal to only that part of their overall volume not taken up by the numerous voids, whereby the cost of the investment material in, and the weight of, the mold bodies are correspondingly low.

It is a further object of the present invention to devise a method of making molds of this type with mold bodies of the aforementioned sponge-like formation, involving the use of solid globules which may be hollow but are preferably very inexpensive expanded plastic beads that burn without residue, and featuring formation of the mold bodies from a mixture of investment material and globules, with the globules, if of expanded plastic, being burnt off on heat-treating the molds in usual manner for removal of the disposable patterns therein.

Another object of the present invention is to adapt the aforementioned preferred expanded plastic beads to making especially flask molds according to the method just mentioned which further involves pouring the mold body material in slurry condition into a flask about the disposable pattern therein, by treating the plastic beads of very low specific gravity to increase their gravity to such an extent that they will substantially float at any level in the slurry and thus remain well distributed throughout the same rather than being buoyed to and accumulating at the top thereof.

Further objects and advantages will appear to those skilled in the art from the following, considered in conjunction with the accompanying drawings.

In the accompanying drawings, in which certain modes of carrying out the present invention are shown for illustrative purposes:

FIG. 7 is a longitudinal section through the finished mold;

FIG. 8 is an enlarged fragmentary section through part of the mold as taken on the line 8—8 of FIG. 7;

FIG. 9 is a section through another type of investment mold at an intermediate stage of its formation;

FIG. 10 is an enlarged fragmentary view of part of the mold being formed of FIG. 9;

FIG. 11 is a longitudinal section through the mold of FIG. 9 when finished and ready for casting;

FIGS. 12 to 14 are enlarged sections through a particle of the material used in the formation of the mold of FIG. 11, with the particle being shown at different stages of a certain treatment thereof; and FIG. 15 is a fragmentary view of certain material used in the formation of the mold of FIG. 11.

Figure 1:
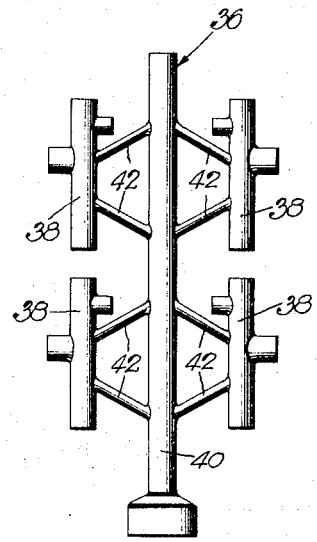
FIG. 1 is an elevational view of an exemplary heat-disposable mold pattern.
Figure 2:
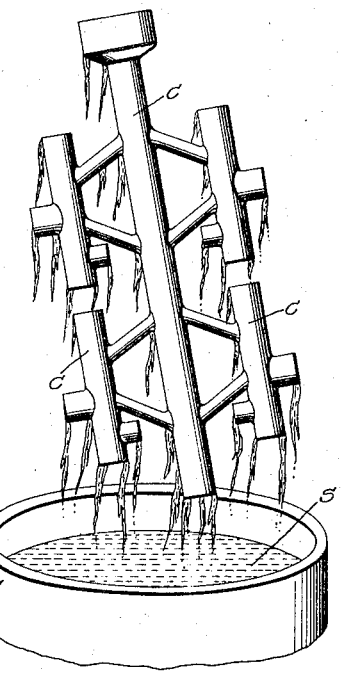
FIGS. 2 to 6 are views showing the progressive formation according to the invention of an investment mold with the disposable pattern of FIG. 1.

Referring to the drawings, and more particularly to FIG. 7 thereof, the reference numeral 20 designates an investment mold of exemplary shell type shown in this instance in a position inverted from that for casting. The mold 20 comprises a rigid mold body 22 which is recessed at 24 to define mold cavities 26 for parts to-be-cast and a gating system in the exemplary form of a central sprue 28 and gates 30 that lead from the sprue 28 to the mold cavities 26. The mold body 22 is made from any of a number of suitable investment materials which are commercially available and consist mostly of a graded refractory filler and a binder, with the investment materials being of usual fine average grain size. However, and in accordance with the present invention, the mold body 22 is not formed solidly throughout from set investment material $i$ but has well distributed throughout a multitude of voids $v$ (FIG. 8) which are, however, spaced from the recess 24 so as to leave the surface 32 thereof smooth and continuous throughout. The mold body 22 is thus sponge-like in its formation except at its recess wall 32, with many of the voids $v$ being continuous with each other and many other voids being separated from each other.

In thus providing the sponge-like mold body 22 with the many voids $v$, the exemplary shell mold 20 is of particularly light weight which is an important advantage in that it greatly facilitates carrying and other handling of the mold before as well as after casting. Thus, with the voids $v$ in the mold body 22 being arranged so that their overall volume may be from less to more than the overall volume of the investment material in the mold body, the weight of the mold is proportionately reduced from the weight which the mold would have if the mold body were formed solidly throughout from investment material. Even more important, the sponge-like mold body 22 affords a quite substantially saving in the cost of the mold and, hence, of the castings therefrom, this by virtue of the large saving in relatively expensive investment material which goes into the making of the mold body. Also, the large multitude of voids in the mold body renders the same particularly permeable, which secures the important advantage of permitting molten metal poured into the mold quickly to displace the air from the mold recess and, hence, penetrate the same throughout before the metal becomes appreciably chilled. The ensuing castings are thus of optimum metallurgical soundness throughout, with even particularly thin-walled parts of castings being entirely satisfactory in all respects, and many entirely satisfactory castings being produced by mere metal pouring from the air and without resorting to vacuumatic or other known special expediencies for accelerated metal flow in the mold which were required for producing the same castings in previous molds. Further, the sponge-like mold body is an exceptionally good heat insulator owing to the good heat-insulating property of the large body of air in the many voids $v$. This secures another important advantage in that during the time between completing firing of the mold to casting temperature and actually charging the same with molten metal the mold loses little heat, whereby sound castings will be produced with molten metal which need not, and advantageously is not, overly hot and will nevertheless flow freely in the mold. Also, the exceptionally good heat-insulating property of the mold makes for substantially uniform progressive solidification throughout of the poured metal in the mold even despite large differences in local metal bulk in the casting, and hence leaves the casting with permanent stresses which, if occurring at all, are no more than negligible. The sponge-like mold body has this further important advantage that shake-out of a casting therefrom is considerably facilitated in that the mold will readily break apart and away from the casting on subjecting the mold to the accustomed foundry procedures to that end, such as using hand hammers or pneumatic vibrating equipment.

Figure 3:
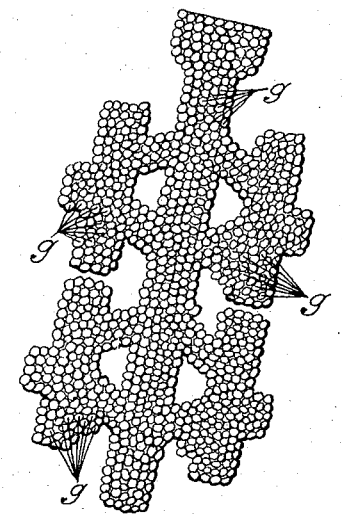
Figure 4:
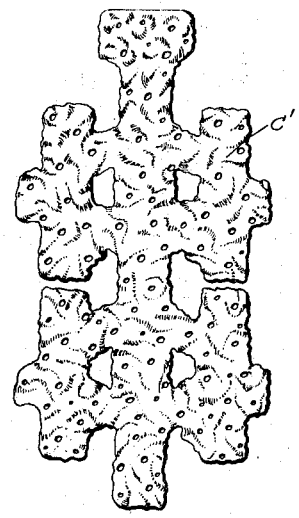
Figure 5:
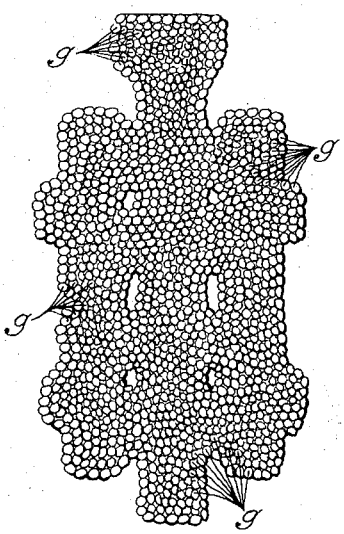
Figure 6:
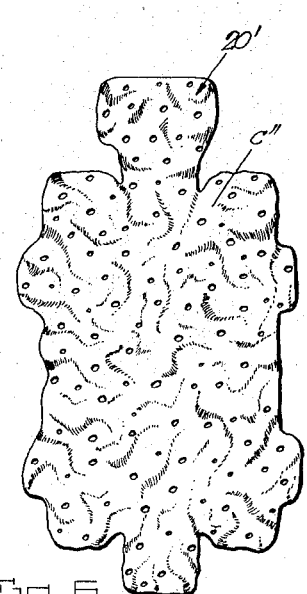

Involved in making the exemplary shell-type mold 20 of FIG. 7 is a process which forms another aspect of the present invention and is demonstrated in FIGS. 1 to 6. Thus, FIG. 1 shows a pattern 36 of heat-disposable material such as wax or a plastic that will melt at relatively low temperature, with the parts 38, 40 and 42 of the exemplary pattern defining the eventual mold cavities 26, sprue 28 and gates 30, respectively, in the finished mold (FIG. 7). In making the mold, the pattern 36 is first dipped at least once, but preferably twice, into a slurry $s$ in a container 44 (FIG. 2), with excess slurry being permitted to drip back into the container. The pattern is permitted to dry, usually in the air, after each dip. The slurry $s$ is a mixture of investment material and a suitable readily evaporative liquid vehicle, with the refractory grain of the investment material being preferably of a finer size for the initial coat $c$ on the pattern which is to form the smooth wall 32 of the recess 22 in the finished mold (FIGS. 7 and 8). The initially coated pattern is next dipped again into a slurry which may be the same as in FIG. 2, but is preferably a slurry with a coarser refractory grain in the investment material. The thus recoated pattern is then covered, while still wet, with globules $g$ which adhere to the wet coating, with the pattern then being permitted to dry, usually in the air, whereby the globules become firmly bonded to the coated pattern (FIG. 3). The globules $g$ may be of any suitable kind of a size much larger than the average grain size of the investment material used in the process and of preferably considerably lower specific gravity than the investment material. In this instance, the globules $g$ are preferred expanded beads of plastic which are very inexpensive and are burnable without residue, such as expanded polystryene beads, for example, which have a very low specific gravity. The beads $g$ may be applied to the wet pattern in any suitable manner, as by sifting them onto the pattern or turning the latter in a supply of beads, for example. The beads $g$ will cling to the pattern substantially in a single layer (FIG. 3) since any other superposed beads thereon will in the course of drying the web coating on the pattern usually drop off owing to inadequate adherence to the pattern. With the initial bead-covered coating on the pattern dried (FIG. 3), the same process is respected by dipping the same into the slurry and covering the coating just applied with additional beads, and thereupon permitting this coating to dry. The pattern thus redipped is shown in FIG. 4, with the initial layer of beads being fairly covered by the coating $c'$ just applied, while FIG. 5 shows the pattern with the second layer of applied beads $g$. The still wet coating $c'$ on the pattern is then permitted to dry. This process of dipping the pattern in the slurry and applying beads thereon while the coating is still wet may be repeated as often as is necessary to build up the mold body to its requisite thickness and ultimate strength. In this instance, however, the two applied layers of beads are sufficient for adequate build-up of the exemplary mold, wherefore on drying the last applied coating on the pattern (FIG. 5) the latter is for the last time dipped into the slurry to receive the final coating $c''$ which fairly covers the last applied layer of beads (FIG. 6), whereupon the coating $c''$ is permitted to dry. This concludes the build-up of the mold body in the intermediate mold form 20' in FIG. 6 which has the outline of the finished mold 20 in FIG. 7 but still contains the disposable pattern 36 and the expanded plastic beads $g$. The intermediate mold 20' is then finish-processed to the final shell mold of FIG. 7, by next placing it into an oven or steam autoclave (neither shown) in which it is subjected to a temperature adequate to complete the chemical action of the mold material, to dry the mold, to melt out the bulk of the disposable pattern 36, and to burn out most, if not all, of the plastic of the beads $g$ substantially without leaving any residue to form in the mold the numerous voids $v$ (FIG. 8). The intermediate mold 20' is to this end placed upside down into the oven or autoclave to permit run-out of the molten material of the pattern 36. For the final formation of the intermediate mold 20' into the finished mold 20 of FIGS. 7 and 8, the intermediate mold 20' is fired, usually by placing it into a burn-out oven wherein all traces of the disposable pattern 36 and also any traces of the plastic beads $g$ remaining in the intermediate mold are burnt out. The shell mold 20 is now finished, and the same is usually left in the burn-out oven until casting time so as to have as high a temperature as possible at the time of casting for producing precision castings of the close tolerances so characteristic of investment casting.

While in the described process of making the shell mold 20 expanded plastic beads were used in the build-up of the mold for producing the eventual voids $v$ therein, it is, of course, fully within the purview of the present invention to use, in lieu of such plastic beads, globules of any suitable material of somewhat comparable size and specific gravity. Thus, there have been used successfully in the build-up of shell molds hollow globules of ceramic material which are known to the trade as "alumina" and are commercially available. These globules, which are as nearly spherical as expanded plastic beads, blend with the hardened investment material of the mold body and form the same voids as do burnt-out expanded plastic beads.

The formation of the shell mold 20 according to the described method adds further important advantages to those already described of the mold itself. Thus, the formation of the present shell mold, involving only a few dippings of the disposable pattern and a few applications of expanded plastic beads to build up the mold to adequate wall thickness and strength, requires considerably less time and manpower than the formation of previous shell molds with their laborious and time-consuming build-up from investment material alone, wherefore the overall cost of the present mold is reduced still further from that of previous molds. Also, the formation of the present mold with the great multitude of voids throughout permits exceptionally short pattern-disposing and burn-out cycles, with the pattern-disposing cycle being performed even advantageously in a steam autoclave. Further, owing to the sponge-like formation of the present mold and the lack of sharp corners at the many voids therein due to their formation from spherical or near-spherical bodies, the mold is far less susceptible to cracking than previous molds.

The present invention also fully extends to an investment mold 50 of flask type (FIG. 11). In preparing this mold, a heat-disposable pattern 36a is dipped preferably twice into a slurry of investment material and dried after each dip, much in the manner in which the described pattern 36 is dipped in FIG. 2 and then dried. The pattern 36a with its dry coating ca is then placed, upside down, onto a support 52 (FIG. 9) whereupon a flask 54 is also placed on the support 52 in surrounding relation with the coated pattern 36a, with the flask 54 being suitably sealed at the support 52 usually with wax (not shown). Next, there is poured into the flask 52 an investment slurry sa which is permitted to dry and harden, whereupon the then intermediate flask mold is finished by subjecting it to the previously described melt-out and burn-out cycles, as will be readily understood.

In accordance with the present invention, the slurry sa poured into the flask 54 has, in addition to investment material and a liquid vehicle, a multitude of globules ga (FIG. 10) which preferably are expanded plastic beads. Being preferred plastic beads, their specific gravity is so low that they would in the flask 54 float to the top of the slurry therein and there accumulate rather than remain well distributed throughout the slurry as in FIG. 10. Therefore, the expanded plastic beads ga are pretreated to increase their specific gravity to such an extent that they will, on their subsequent mixing with investment material and the preparation of the slurry sa, substantially float at any level in the slurry rather than being buoyed to, and accumulating at, the top thereof. Among successful pretreatments of the beads ga to this end is the coating, and preferably repeating coating, of the beads with refractory of much higher specific gravity than the beads. Thus, FIG. 12 shows a greatly enlarged expanded plastic bead ga to which is applied in any suitable manner, such as by dipping or spraying, for example, investment slurry to form a coating ca' thereon (FIG. 13) which is permitted to dry, whereupon another coating ca" of investment material is applied and permitted to dry (FIG. 14). Two refractory coatings thus applied to expanded polystyrene beads have been found adequate for substantially floating the beads at all levels in an investment slurry of accustomed consistency. With the expanded plastic beads ga thus pretreated, the mold body 60 of the finished flask mold 50 is, like the body of the described shell mold 20 of FIGS. 7 and 8, of sponge-like formation throughout, except at the smooth wall 62 of the recess 64 therein. The instant flask mold 50 has, of course, most of the important advantages of the described shell mold 20 of FIG. 7.

It is, of course, entirely feasible to use in the slurry sa, in lieu of pretreated expanded plastic beads, other globules of approximately the right specific gravity substantially to float at all levels in a slurry of compatibly prepared consistency. Thus, the aforementioned alumina globules, for example, have been found satisfactory for this purpose.

FIG. 15 shows an investment compound 70 according to the invention which is ready-mixed and may be purchased and/or stored in any suitable container 72, with the compound consisting of investment material 74 of the usual fine average grain size, and globules 76 of much larger size and lower specific gravity than the investment material. The globules 76 may be of any suitable kind, such as pretreated expanded plastic beads or alumina bodies, for example.

The invention may be carried out in other specific ways than those herein set forth without departing from the spirit and essential characteristics of the invention, and the present embodiments are, therefore, to be considered in all respects as illustrative and not restrictive, and all charges coming within the meaning and equivalency range of the appended claims are intended to be embraced therein.

What is claimed is:

1. In a method of making an investment flask mold, involving pouring a mold body compound slurry into a bottom-closed flask and about a heat-disposable pattern therein and permitting it to harden in the flask, that improvement which comprises at least once coating the pattern with an investment material slurry and drying the coating; preparing the body compound by mixing investment material of given average grain size and globules of much larger size than said grain size and of lower specific gravity than the investment material, with the investment material and globules being in such respective amounts that in the aforesaid pouring of the hereinafter recited prepared slurry into the flask and hardening therein of the mold body, the latter would be of sponge-like formation if said globules were absent; and preparing the slurry by mixing the compound with evaporative liquid to a watery consistency at which the investment material is distributed throughout, and the globules will float substantially at any level in the slurry.

2. In a method of making an investment flask mold, involving pouring a mold body compound slurry into a bottom-closed flask and about a heat-disposable pattern therein and permitting it to harden in the flask, and firing the mold body in the flask for complete disposal of the pattern material, that improvement which comprises coating expanded beads of plastic burnable without residue with a material of greater specific gravity than the beads; preparing the body compound by mixing investment material and coated expanded beads; and preparing the slurry by mixing the compound with evaporative liquid to a consistency at which the coated beads will float substantially at any level in the slurry, with the beads being burnt off on firing the mold body in the flask.

3. The method improvement set forth in claim 2, in which the investment material and coated expanded beads of the body compound are in their respective amounts such that the overall volume of the coated expanded beads may be from less to more than the overall volume of the investment material.

(References on following page)

References Cited

UNITED STATES PATENTS

| | | | | |
|---|---|---|---|---|
| 2,147,880 | 2/1939 | Campbell | 164—350 |
| 2,912,729 | 11/1959 | Webb | 164—361 |
| 3,138,836 | 6/1964 | Amala | 164—43 |
| 3,022,555 | 2/1962 | Shaw | 164—12 |
| 1,882,701 | 10/1932 | Alley | 106—38.3 |
| 1,901,052 | 3/1933 | Dailey | 106—38.3 |
| 2,948,032 | 8/1960 | Reuter | 164—26 |
| 2,996,389 | 8/1961 | Fernhof | 260—2.5 X |
| 3,112,541 | 12/1963 | Bohn et al. | 164—24 |
| 3,114,948 | 12/1963 | Poe | 164—35 |

FOREIGN PATENTS

| | | |
|---|---|---|
| 903,502 | 8/1962 | Great Britain. |
| 302,619 | 1/1955 | Switzerland. |

J. SPENCER OVERHOLSER, *Primary Examiner.*

E. MAR, *Assistant Examiner.*